United States Patent
Liang et al.

(10) Patent No.: US 11,239,978 B2
(45) Date of Patent: Feb. 1, 2022

(54) METHOD AND DEVICE FOR HARQ FEEDBACK

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/960,754

(22) PCT Filed: Jan. 9, 2018

(86) PCT No.: PCT/CN2018/071948
§ 371 (c)(1),
(2) Date: Jul. 8, 2020

(87) PCT Pub. No.: WO2019/136599
PCT Pub. Date: Jul. 18, 2019

(65) Prior Publication Data
US 2020/0351060 A1    Nov. 5, 2020

(51) Int. Cl.
*H04L 5/00*    (2006.01)
*H04W 16/14*    (2009.01)
*H04W 28/04*    (2009.01)
*H04L 1/18*    (2006.01)

(52) U.S. Cl.
CPC .......... *H04L 5/0055* (2013.01); *H04L 1/1887* (2013.01); *H04L 5/0007* (2013.01); *H04W 16/14* (2013.01); *H04W 28/04* (2013.01)

(58) Field of Classification Search
CPC ....... H04W 28/04; H04L 1/1887; H04L 5/055
USPC ......................................................... 370/330
See application file for complete search history.

(56) References Cited

FOREIGN PATENT DOCUMENTS

| CN | 101741528 A | 6/2010 |
|---|---|---|
| WO | 2016/122846 A1 | 8/2016 |
| WO | 2017/138853 A1 | 8/2017 |
| WO | 2017/205669 A1 | 11/2017 |

OTHER PUBLICATIONS

LG Electronics, "Consideration on HARQ-ACK feedback method for NR", 3GPP TSG RAN WG1 Meeting #89, R1-1707656, May 15-19, 2017, 5 pgs., Hangzhou, P.R. China.
Samsung, "Triggered HARQ-ACK Transmissions", 3GPP TSG RAN WG1 #89, R1-1708028, May 15-19, 2017, 2 pgs., Hangzhou, China.
International Search Report for PCT/CN2018/071948 dated Sep. 25, 20108 (PCT/ISA/210).
Written Opinion of the International Searching Authority for PCT/CN2018/071948 dated Sep. 25, 2018 (PCT/ISA/237).

(Continued)

Primary Examiner — Angel T Brockman
(74) Attorney, Agent, or Firm — Sughrue Mion, PLLC

(57) ABSTRACT

Embodiments of the disclosure generally relate to feedback of a HARQ acknowledgement. A network device transmits, to a terminal device, a first trigger indicating a feedback mode of a HARQ acknowledgement. The feedback mode is selected from at least one of: a trigger mode, a timing mode, and a mixed mode. In response to successful access to an unsilenced band allocated to the HARQ acknowledgement, the network device transmits, to the terminal device, a second trigger indicating at least one target terminal device that is to feedback the HARQ acknowledgement based on the feedback mode indicated by the first trigger.

4 Claims, 5 Drawing Sheets

(56) References Cited

OTHER PUBLICATIONS

Mukherjee et al., "HARQ Feedback in Unlicensed Spectrum LTE: Design and Performance Evaluation", 2017 IEEE Wireless Communications and Networking Conference (WCNC), Mar. 19, 2017, XP033095692 (6 pages total).

Nokia et al., "eLAA UL scheduling / UL grant details", 3GPP TSG RAN WG1 Meeting #85, R1-164941, Nanjing, China, May 23-27, 2016, XP051096812 (9 pages total).

Extended European Search Report dated Dec. 4, 2020 from the European Patent Office in EP Application No. 18899851.2.

Japanese Office Action for JP Application No. 2020-537769 dated Nov. 16, 2021 with English Translation.

METHOD AND DEVICE FOR HARQ FEEDBACK

CROSS REFERENCE TO RELATED APPLICATIONS

This application is a National Stage of International Application No. PCT/CN2018/071948 filed Jan. 9, 2018.

TECHNICAL FIELD

Embodiments of the present disclosure generally relate to the field of communications, and more particularly, to a method and device for feedback of a Hybrid Automatic Repeat Request (HARQ) acknowledgement on unlicensed band.

BACKGROUND

Unlicensed band operation has been studied and applied in 3GPP, for example, Licensed Assist Access (LAA). According to conventional standards, due to the absence of Physical Uplink Control Channel (PUCCH) in an unlicensed band and mandatory presence of a licensed primary cell, HARQ acknowledgement (also referred to as HARQ-ACK) is delivered on the licensed cell.

Newly-developed mobile standards, for example, a New Radio (NR) system, support unlicensed band operation, especially, feedback of HARQ-ACK on the unlicensed band. In an example scenario in NR, the feedback of HARQ-ACK is standalone deployment, which means that no licensed band is involved in the feedback. Thus, there is a need for a scheme to feedback the HARQ-ACK on unlicensed band.

SUMMARY

In general, embodiments of the present disclosure provide a solution for solving the issue as discussed above.

In a first aspect of embodiments of the present disclosure, embodiments of the present disclosure provide a method performed by a network device. The network device transmits, to a terminal device, a first trigger indicating a feedback mode of a HARQ acknowledgement. The feedback mode being selected from at least one of: a trigger mode, a timing mode, and a mixed mode. In response to successful access to an unsilenced band allocated to the HARQ acknowledgement, the network device transmits, to the terminal device, a second trigger indicating at least one target terminal device that is to feedback the HARQ acknowledgement based on the feedback mode indicated by the first trigger.

In a second aspect of embodiments of the present disclosure, embodiments of the disclosure provide a network device. The network device comprises: a processor and a memory. The memory contains the memory containing program including instructions executable by the processor, the processor being configured to cause the network device to perform the method according to the first aspect of the present disclosure.

In a third aspect of embodiments of the present disclosure, embodiments of the present disclosure provide a computer-readable storage medium. The computer-readable storage medium having instructions stored thereon, the instructions, when being executed by a network device, causing a network device to perform the method according to the first aspect of the present disclosure.

In a fourth aspect of embodiments of the present disclosure, embodiments of the present disclosure provide a method performed by a terminal device. The terminal device receives, from a network device, a first trigger indicating a feedback mode of a HARQ acknowledgement, the feedback mode being selected from at least one of: a trigger mode, a timing mode, and a mixed mode. In response to the feedback mode being the trigger mode or the mixed mode, the terminal device detects, from the network device, a second trigger indicating at least one target terminal device that is to feedback the HARQ acknowledgement.

In a fifth aspect of embodiments of the present disclosure, embodiments of the disclosure provide a terminal device. The terminal device comprises: a processor and a memory. The memory contains the memory containing program including instructions executable by the processor, the processor being configured to cause the terminal device to perform the method according to the fourth aspect of the present disclosure.

In a sixth aspect of embodiments of the present disclosure, embodiments of the present disclosure provide a computer-readable storage medium. The computer-readable storage medium having instructions stored thereon, the instructions, when being executed by a terminal device, causing a terminal device to perform the method according to the fourth aspect of the present disclosure.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
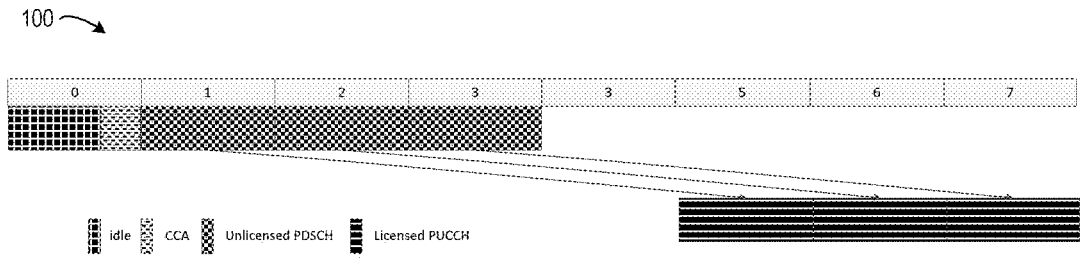
FIG. 1 shows a schematic diagram 100 of a conventional scheme of feedback of a HARQ acknowledgement.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio Access (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a NodeB in NR (gNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Now some exemplary embodiments of the present disclosure will be described below with reference to the figures. Reference is first made to FIG. 1, which illustrates schematic diagram of shows a schematic diagram 100 of a conventional scheme of feedback of a HARQ acknowledgement.

The embodiments of FIG. 1 illustrate feedback of HARQ-ACK in LAA. In the embodiments, downlink data are transmitted in Physical Downlink Shared Channel (PDSCH) via an unlicensed band, and the HARQ-ACK is transmitted via PUCCH on a licensed band. Timing on unlicensed PDSCH (frame structure 3) is treated as Frequency Division Duplexing (FDD) (frame structure 1) timing. That means, if primary cell (Pcell) is FDD, PDSCH on subframe n will feedback on licensed PUCCH on subframe n+4.

It is thus can be seen that the traditional HARQ-ACK feedback is timing-based, which means that the timing between HARQ-ACK UL slot and scheduled PDSCH slot is determined. For example, it is 4 subframes for LTE-FDD, and k subframes for TD-LTE where k can be determined by TDD configuration.

For the NR system, the timing k may be indicated by Downlink Control Information (DCI) or static configured by Radio Resource Control (RRC). All these licensed band mobile communication systems use predefined and determined timing based HARQ-ACK feedback. For unlicensed band LAA, as HARQ-ACK feedback PUCCH is delivered on licensed band, it also uses the conventional timing based method.

However, if NR is deployed standalone on unlicensed band, timing based feedback may be blocked due to the failure of Listen Before Talk (LBT) when timing interval between DL and feedback UL is longer than the threshold.

In order to solve the above and other potential problems, embodiments of the present disclosure provide solutions for feedback of the HARQ-ACK on the unlicensed band. In the proposed solution, PDSCH can continuously transmit within Maximum Channel Occupied Time (MCOT), and feedback once it is triggered. In particular, a network device transmits a first trigger indicating a feedback mode of a HARQ-ACK. In response to successful access to an unlicensed band allocated to the HARQ acknowledgement, the network device further transmits a second trigger indicating at least one target terminal device that is to feedback the HARQ-ACK based on the feedback mode indicated by the first trigger. With the two triggers, the block possibility due to LBT can be significantly reduced.

Figure 2:
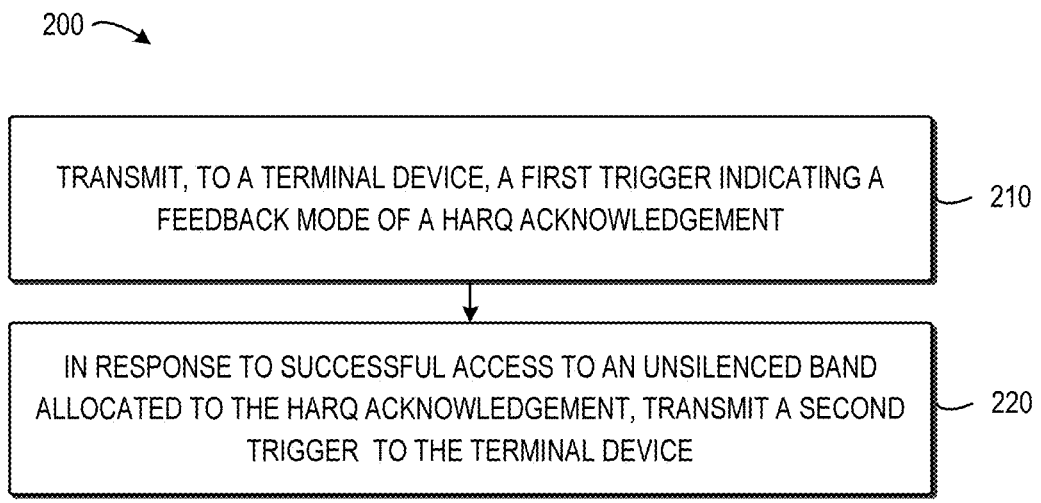
FIG. 2 shows a flowchart of a method 200 of feedback of a HARQ acknowledgement in accordance with embodiments of the present disclosure.

More details of embodiments of the present disclosure will be discussed with reference to figures below. FIG. 2 shows a flowchart of a method 200 of feedback of a HARQ acknowledgement in accordance with embodiments of the present disclosure. With the method 200, the above and other potential deficiencies in the conventional approaches can be overcome. It would be appreciated by those skilled in the art that the method 200 may be implemented by a network device, for example, a gNB.

The method 200 is entered at 210, where the network device transmits, to a terminal device, a first trigger indicating a feedback mode of a HARQ acknowledgement. The feedback mode is selected from at least one of: a trigger mode, a timing mode, and a mixed mode.

According to embodiments of the present disclosure, the trigger mode represents a mode in which the HARQ-ACK is fed back according to triggers, namely, the first and second triggers as discussed. The timing mode represents a mode in which the HARQ-ACK is fed back based on timing. The mixed mode is a mode in which the timing mode is tried first, and if failed, the terminal device waits for the triggers.

In some embodiments, the first trigger may further indicate a HARQ acknowledgement group including slots and/or subframes to be fed back by the HARQ acknowledgement, a resource allocated for transmission of the HARQ acknowledgement (also referred to as "allocated resource" or "PUCCH resource" hereafter), feedback timing, and/or the like.

In some embodiments, in the timing mode, one or more bit fields may be used to indicate feedback timing. In the trigger mode or the mixed mode, the same bit field may be reinterpreted as HARQ-ACK group and the allocated resource.

In some embodiments, the HARQ acknowledgement group may comprise all schedulable subframes after the first trigger is transmitted. In other words, the HARQ acknowledgement of all schedulable subframes may be fed back in scheduled order since last trigger.

Alternatively, in some embodiments, the HARQ acknowledgement group may just comprise a portion of the schedulable subframes. For example, a trigger window may be set according to system rudiments, specifications and so on. Assuming no repeat new data HARQ process within a trigger window, all HARQ process may be divided into several groups, and one or more groups may be fed back. In another example, all schedulable subframes in the trigger window may be indicated by the HARQ acknowledgement group, where the window size may be indicate in DCI associated with the second trigger.

At 220, in response to successful access to an unsilenced band allocated to the HARQ acknowledgement, the network device transmits a second trigger to the terminal device. The second trigger indicates one or more terminal devices (also referred to as "target terminal device" hereafter) that are to feedback the HARQ acknowledgement based on the feedback mode indicated by the first trigger. For example, the second trigger may include identifier(s) of the target terminal device(s).

In some embodiments, the second trigger is a common trigger indicating that all terminal devices are to feedback the HARQ acknowledgement. In other words, all the terminal devices are target terminal devices in this case.

Alternatively, the second trigger may be a dedicated trigger indicating that one or more dedicated terminal devices are to feedback the HARQ acknowledgement. In such a case, the target terminal devices merely include the dedicated terminal device(s).

In addition or alternatively, the second trigger may further indicate that the feedback is to be performed on the allocated resource.

According to embodiments of the present disclosure, method 200 may further include a step of receiving the HARQ acknowledgement from one or more target terminal devices after a time interval from the transmission associated with the second trigger. In some embodiments, the time interval may be set as 25 µs.

In view of the forgoing discussion of the embodiments, the blocking possibility of the feedback of the HARQ-ACK due to failure of LBT can be significantly reduced, and transmission efficiency can be effectively improved.

Figure 3:
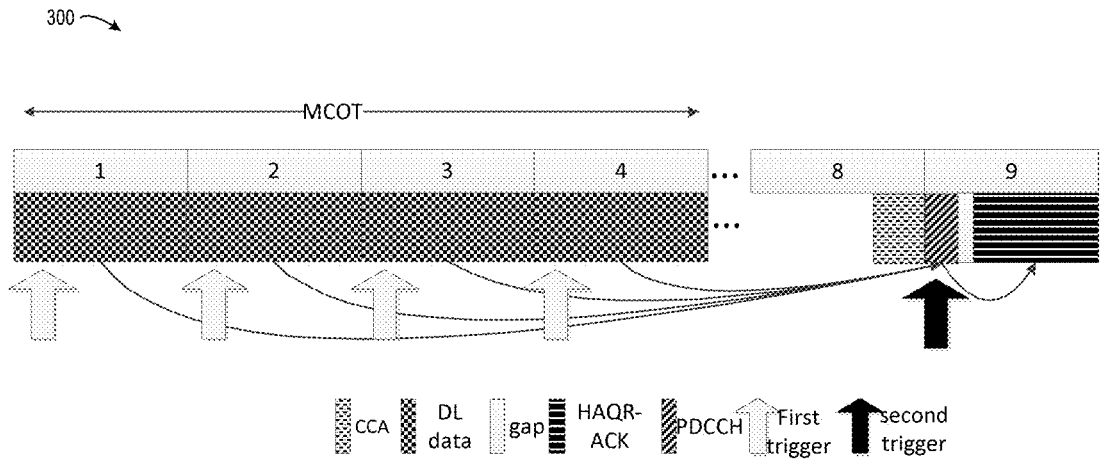
FIG. 3 shows a schematic diagram 300 of feedback of a HARQ acknowledgement in accordance with embodiments of the present disclosure.

More details will discussed with respect to FIG. 3, which shows a schematic diagram 300 of feedback of a HARQ acknowledgement in accordance with embodiments of the present disclosure.

In trigger-based HARQ-ACK feedback, the first trigger may be transmitted in DCI in each scheduled PDSCH transmission. The first trigger may carry information including 1 or 2 bits indicating HARQ-ACK feedback mode in one of trigger mode, timing mode or mix mode. The trigger mode means that transmission of HARQ-ACK feedback associating with PDSCH indicated by DCI is on hold and waits for the second trigger to activate. The timing mode means that transmission of HARQ-ACK feedback associating with PDSCH indicated by DCI is transmitting based on timing information indicated by DCI. The mix mode means that transmission of HARQ-ACK feedback associating with PDSCH indicated by DCI is transmitting based on timing information indicated by DCI firstly. If timing transmission fails due to LBT, transmission of HARQ-ACK feedback associating with PDSCH indicated by DCI is on hold and waits for the second trigger to activate.

The second trigger may be used for triggering uplink HARQ-ACK feedback transmitting. When a network device, for example, gNB, acquires the channel access, it transmits the second trigger information indicated within DCI. The second trigger may be a common trigger in DCI scrambled by common RNTI or dedicated trigger scrambled by dedicated RNTI. The second trigger may carry information about PUCCH resource and time information indicating the end of downlink transmission. The terminal device, for example, a UE, may transmit HARQ-ACK after a time interval at the ending of downlink transmission. The time interval may be 25 µs for better coexistence. In this way, HARQ-ACK feedback may be performed under better control.

Before a terminal device transmits the HARQ-ACK, it first determines its HARQ-ACK group and then feeds back corresponding group HARQ-ACK information. HARQ-ACK group includes slots and/or subframes to be fed back by the HARQ acknowledgement.

One example of HARQ-ACK group for a UE is that HARQ-ACK group slots are all scheduled PDSCH slots since last HARQ-ACK feedback transmission and no earlier than UE's configuration of minimal feedback slots. Once a second trigger, which is a common trigger, is received by the UE, the UE will know that all UEs will feedback HARQ-ACK corresponding to their HARQ-ACK groups on their predefined resources. As shown in FIG. 3, a UE receives PDSCH indicated by DCI trigger mode in slots 1,2,3,4 since last feedback. In this case, the HARQ-ACK group is {1,2, 3,4}. Once UE successfully decodes second trigger DCI scrambled by common RNTI in slot 9, it will feedback HARQ-ACK of its HARQ-ACK group {1,2,3,4} to gNB on its allocated resource.

Another example of HARQ-ACK group is that divided slots into group and each group corresponding to a HARQ-ACK group periodically. For example, slots number in each group is 4 and group size is 5. That means, absolute slot 0,1,2,3 is group 0, absolute slot 4,5,6,7 is group 1, . . . , absolute slot 16,17,18,19 is group 4 and absolute slot 20 20,21,22,23 is group 0 periodically. As shown in FIG. 3, the UE successfully decodes the DCI which includes the second trigger and is scrambled by dedicated RNTI in slot 9. The UE thus can know that the second trigger indicates a feedback HARQ-AKC group index 0. Then the nearest group with indicated group index will be transmitted in this occasion. For example, slots 0,1,2,3 are feedback, even slot 0 has no PDSCH and slot 4 has PDSCH, 25 slot 0 should feedback Discontinuous Transmission (DTX) to indicate that PDCCH is not received in this feedback and slot 4 should wait for the occasion indicating group index 1. Group index indication may be a bitmap, which means that group 0 and group 1 can be indicated at the same time in one second trigger dedicated DCI.

In some embodiments, the feedback of the HARQ-ACK may be encoded in a variety of ways. For example, 3 HARQ-bits for 2 subframes feedback per codeword may be implemented as follows. In this case, 2 subframes have 9 states, and 3 bits of one codeword have 8 states. So, there is at least one mapping of 2 to 1, and the rests are 1 to 1 mapping. As "NACK NACK" and "DTX DTX" means that the channel condition is bad, they can be encoded together into one codeword. The rests are one to one mapping into each codeword. In this way, the mismatch between gNB and UE due to failed detection of PDCCH can be solved by nearly one to one mapping. Table 1 shows an example of encoding of the HARQ-bits.

TABLE 1

| Encoding | Subframe 2*i | Subframe 2*i + 1 |
| --- | --- | --- |
| 0 | ACK | ACK |
| 1 | ACK | NACK |
| 2 | ACK | DTX |
| 3 | NACK | ACK |
| 4 | NACK | DTX |
| 5 | DTX | ACK |
| 6 | DTX | NACK |
| 7 | NACK/DTX | NACK/DTX |

It is to be understood that the above example of the encoding of the HARQ-ACK is discussed for illustrations, rather than limitation. Those skilled in the art would appreciate that the encoding can be implemented other suitable ways within the scope of the present disclosure.

More embodiments of the present disclosure are now discussed below.

Generally, before transmission on an unlicensed band, the network node needs to sense the state of a channel, that is, whether the channel is busy or idle. After sensing the channel is idle for a while, the network node can access the channel. This process is referred to as Clear Channel Access (CCA) or LBT.

In LAA, it is specified 4 categories of LBT, namely, Cat. 1 to 4. Two most frequently-used types are:

Cat.2: LBT without back off, e.g. 25 μs LBT; and
Cat.4: LBT with random back off, e.g. window size is 7, first generate a random number [0, 7], take 3 for example. And LBT time is 34+3*9=61 μs.

Maximum Channel Occupied Time (MCOT) is the maximum occupied time of a single access. Within MCOT, a cat.2 LBT can be used. While outside MCOT, Cat.4 LBT is needed for fair coexistence.

To achieving better performance and simpler implementation for standalone NR unlicensed band HARQ-ACK feedback, according to embodiments of the present disclosure, HARQ timing is designed for self-contained feedback to satisfy LBT.

In some embodiments, a specific TA offset and fractional and/or complete Orthogonal Frequency Division Multiplexing (OFDM) symbols for LBT are employed for HARQ timing.

After successful of CCA, the network device, for examples a gNB, starts to transmit downlink data to a terminal device, for example, a UE. When the gNB finishes transmission, the UE may feedback HARQ-ACK after sensing the channel is idle for a time interval (also referred to as a "gap" which is denoted as "t_ack"). In some embodiments, the length of the gap may be set as 25 μs. That is, t_ack=25 μs.

Figure 4:
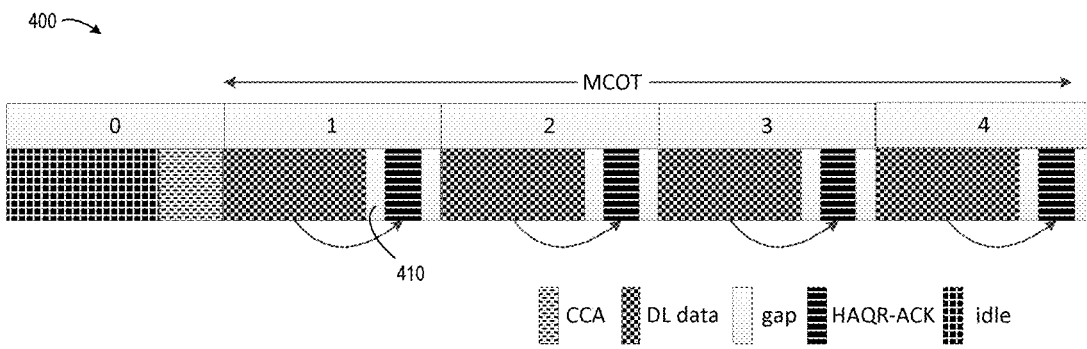
FIG. 4 shows a schematic diagram 400 of feedback of a HARQ acknowledgement in accordance with embodiments of the present disclosure.

FIG. 4 shows a schematic diagram 400 of feedback of a HARQ acknowledgement in accordance with embodiments of the present disclosure. As shown in FIG. 4, gNB can continue transmitting downlink data after sensing channel is idle for a gap t_ack following uplink HARQ-ACK feedback signals. The gap is indicated by 410 in FIG. 4.

For an unlicensed band, reference TA offset is at least t_ack, i.e. 768 Ts (768*64 Tc, 25 μs). As for LTE-FDD, Reference TA offset is 0 Ts, and as for LTE-TDD, Reference TA offset is 624 Ts (20.3125 μs).

Figure 5:
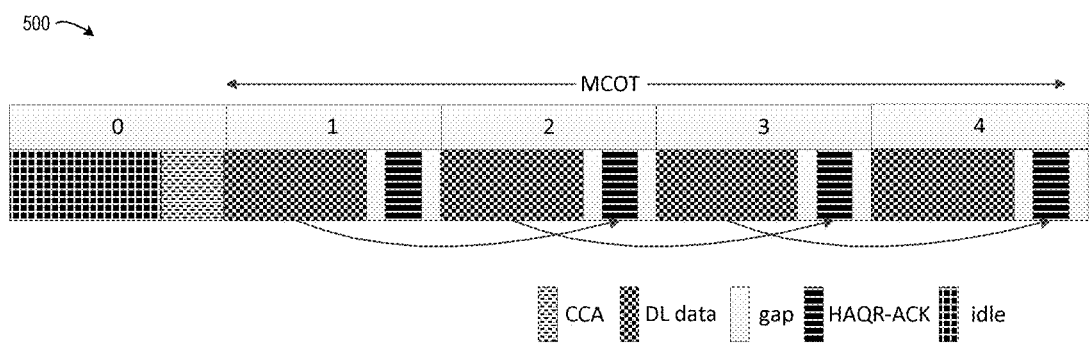
FIG. 5 shows a schematic diagram 500 of feedback of a HARQ acknowledgement in accordance with embodiments of the present disclosure.

Timing between PDSCH data and PUCCH HARQ-ACK may be indicated through DCI. FIG. 5 shows a schematic diagram 500 of feedback of a HARQ acknowledgement in accordance with embodiments of the present disclosure. Specifically, FIG. 5 shows an example of timing delay of 2 subframes. Within MCOT, Cat.2 LBT is used for transmission.

From point of coverage, PUCCH feedback may repeat based on PUCCH format symbol length N_PUCCH and PUCCH resource symbol length N_ACK for HARQ_ACK feedback. N_PUCCH is format indicated by high layer or DCI, and N_ACK may be indicated by DCI or RRC or calculated by Slot Format Indication (SFI) configuration.

For example, in PUCCH format 1, N PUCCH=2. SFI indicates 9 OFDM symbols for DL, so there are 3 complete symbols and 1 fractional symbol (66.7+4.7−25−25=21.4 μs) left for 15 KHz Subcarrier Spacing (SCS).

According to embodiments of the present disclosure, there may be several ways to calculate fractional symbol start position and complete symbol repetition.

In some embodiments, the time-continuous signal $s_l^{(p,\mu)}(t)$ on antenna port p and subcarrier spacing configuration μ for OFDM symbol l in a subframe for any physical channel or signal is transmitted within $0 \le t < (N_u^\mu + N_{CP,l}^\mu)T_c$. In the embodiments, the size of various fields in the time domain is expressed as a number of time units $T_c = 1/(\Delta f_{max} \cdot N_f)$, where $\Delta f_{max} = 480 \cdot 10^3$ Hz and $N_f = 4096$.

The starting position of OFDM symbol l for subcarrier spacing configuration μ in a subframe is given by $$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases} \quad (1)$$

where $$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \ne 0 \text{ and } l \ne 7 \cdot 2^\mu \end{cases}$$

Let $l_{PUCCH,start}^\mu$ indicates the start OFDM symbol of fractional symbol and indicates the end of PDSCH symbol.

$T_{TA}=(N_{TA}+N_{TA,offset})T_c+T_{gap}$ is interval where $N_{TA}+N_{TA,offset}$ is timing advance (TA) signaled by gNB and $T_{gap}$ is interval of downlink and uplink switch time. In some embodiments, $T_{gap}$ is set as 25 us on unlicensed band.

$N_{PUCCH}^\mu$ is the length of PUCCH OFDM symbol for uplink HARQ-ACK transmission, and $N_{start}^\mu$ is the start sample within fractional OFDM symbol corresponding to sample rate $1/T_c$.

With above definition, UE can calculate the start OFDM symbol of fractional symbol $l_{PUCCH,start}^\mu$ and the start sample within fractional OFDM symbol $N_{start}^\mu$ as, $$\min_{l_{PUCCH,start}^\mu} T_{TA} <= \left(t_{start,l_{PUCCH,start}^\mu+1}^\mu - t_{start,l_{PDSCH,end}^\mu+1}^\mu\right) \quad (2)$$

$$N_{start}^\mu = T_{TA}/T_c - \left(t_{start,l_{PUCCH,start}^\mu}^\mu - t_{start,l_{PDSCH,end}^\mu+1}^\mu\right)/T_c.$$

The time-continuous signal $s_l^{(p,\mu)}(t)$ transmitted by the UE is defined below.

If l is $l_{PUCCH,start}^\mu$, in the case of a fractional symbol, $$s_l^{(p,\mu)}(t) = \begin{cases} 0 & 0 \le t < N_{start}^\mu T_c \\ s_{l+1}^{(p,\mu)}(t-N_{CP,l}^\mu T_c) & N_{start}^\mu T_c \le t < (N_u^\mu + N_{CP,l}^\mu)T_c \end{cases} \quad (3)$$

Else, in the case of a complete symbol, $$s_l^{(p,\mu)}(t-N_{CP,l}^\mu T_c) = s_{l+N_{PUCCH}^\mu}^{(p,\mu)}(t-N_{CP,l+N_{PUCCH}^\mu}^\mu T_c). \quad (4)$$

In this way, UE may start to transmit uplink signal, for example, the HARQ-ACK, after the interval of $T_{gap}$ under any subcarrier spacing configuration μ. The proper repetition of the fractional symbol and the complete symbol may be afforded for receiver diversity.

Figure 6:
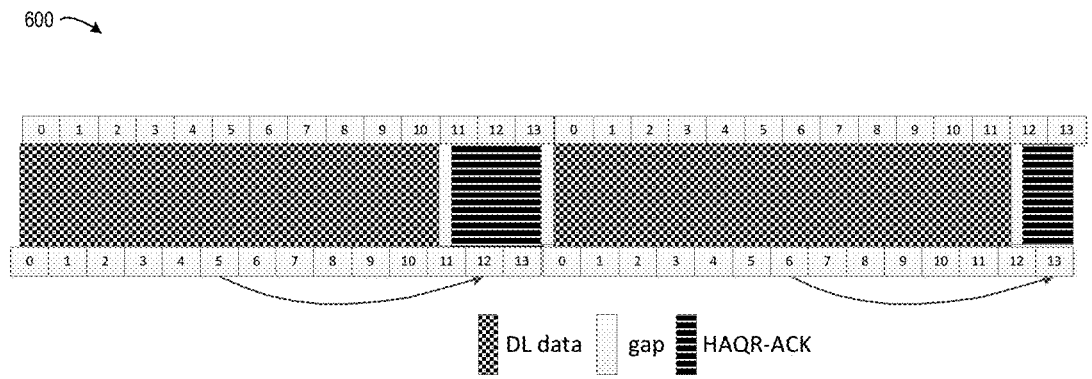
FIG. 6 shows a schematic diagram 600 of feedback of a HARQ acknowledgement in accordance with embodiments of the present disclosure.

FIG. 6 shows a schematic diagram 600 of feedback of a HARQ acknowledgement in accordance with embodiments of the present disclosure. In particular, FIG. 6 shows an example of 2 complete symbols PUCCH and 1 fractional symbol PUCCH for SCS 15 KHz, where fractional symbol is generated on symbol 11 and complete symbols are generated on symbols 12 and 13, respectively.

Figure 7:
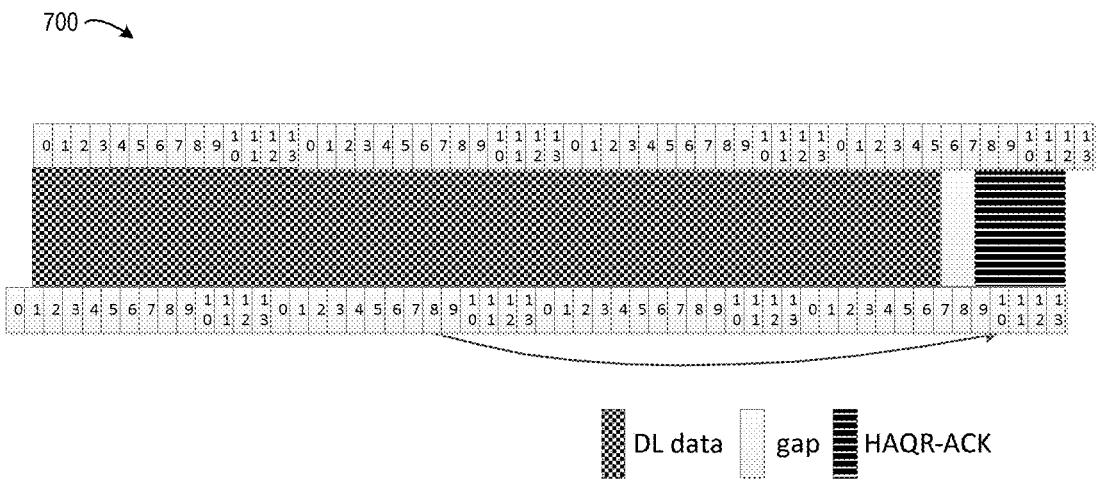
FIG. 7 shows a schematic diagram 700 of feedback of a HARQ acknowledgement in accordance with embodiments of the present disclosure.

FIG. 7 shows a schematic diagram 700 of feedback of a HARQ acknowledgement in accordance with embodiments of the present disclosure. In particular, FIG. 7 shows an example of SCS 60 KHz within one subframe. As shown in FIG. 7, there are 1 factional symbol and 4 complete symbols. The complete symbols include 2 PUCCH symbols and 2 repetition symbols. The duration of the gap lasts more than 1 symbol.

For the case the whole slot is for PUCCH, it starts transmission on fractional symbol 2 based on equations (2)-(4). For the case fractional slot is for PUCCH, PDSCH multiple slot scheduling should indicate the DL OFDM end symbol in PUCCH feedback slot. Transport block is rate matched based on the sum of DL OFDM symbols.

Still more embodiments of the present disclosure are discussed below.

For feedback of the HARQ-ACK, there is a need for a mechanism of resource allocation, especially for occasional or window-based feedback. To solve the problem and potential related issues, embodiments of the present disclosure provide solutions of resource allocation and/or encoding of HARQ-ACK for HARQ-ACK window.

Figure 8:
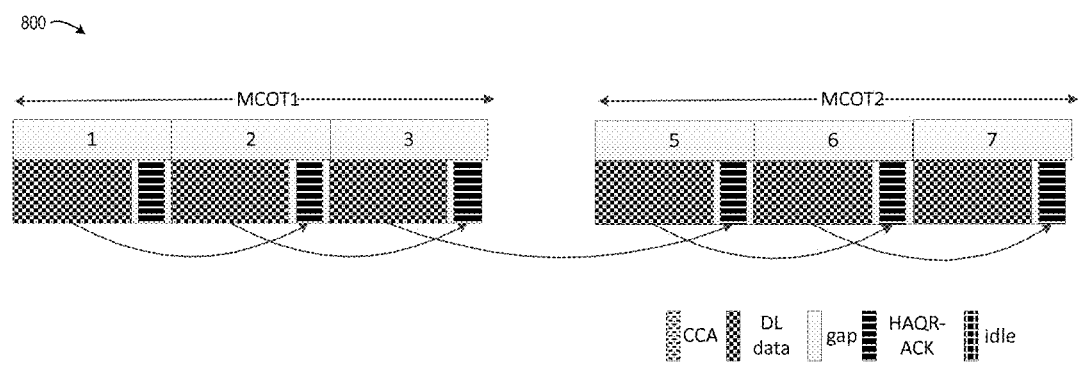
FIG. 8 shows a schematic diagram 800 of feedback of a HARQ acknowledgement in accordance with embodiments of the present disclosure.

FIG. 8 shows a schematic diagram 800 of feedback of a HARQ acknowledgement in accordance with embodiments of the present disclosure. In the example shown in FIG. 8, when PDSCH cannot feedback within a time window (for example, Maximum Channel Occupied Time (MCOT)), a timer can be started. In this example, the time window is referred to as "MCOT1", which includes subframes 1 to 3. Once another MCOT (referred to as "MCOT2") is detected before expiration of the timer, the HARQ-ACK can be fed back in MCOT2. Otherwise, the HARQ-ACK can be fed back on another timing or be abandoned.

In some embodiments, if a UE cannot feedback due to failure of LBT, it may wait for next feedback occasion within a time window, also referred to as a "HARQ-ACK window". If a UE can access the channel in a feedback occasion, it may feedback information of current HARQ-ACK, as well as information of previous HARQ-ACK which is blocked due to failure of LBT.

Figure 9:
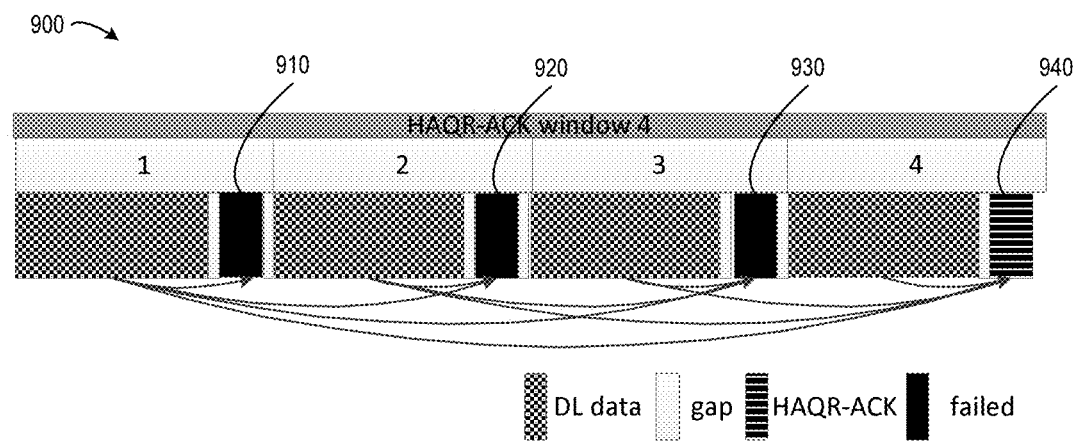
FIG. 9 shows a schematic diagram 900 of feedback of a HARQ acknowledgement in accordance with embodiments of the present disclosure.

FIG. 9 shows a schematic diagram 900 of feedback of a HARQ acknowledgement in accordance with embodiments of the present disclosure. In the example shown in FIG. 9, the HARQ-ACK window is 4, which means that the HARQ-ACK window includes 4 subframes. In subframes 1-3, the UE cannot access the channel and cannot feedback the HARQ-ACK at positions 910, 920 and 930. In the example, the UE successfully accesses the channel in subframe 4 and thus feeds back the HARQ-ACK at position 940.

In some embodiments, there are several encoding schemes for HARQ-ACK feedback, for example, schemes based on multiple codebook, bundling, and partial bundling.

In embodiments using the scheme of multiple codebook, assuming $n_1$ is the resource in the 1st occasion, in i-th occasion, the resource n may be denoted as the following:

$$n_i=(n_1+(i-1)N_{PUCCH}/N_{window})\mod N_{PUCCH} \quad (5)$$

where $N_{PUCCH}$ represents the number of PUCCH resources, and $N_{window}$ represents the HARQ-ACK window size.

In embodiments using the scheme of bundling, all HARQ-ACKs that need to be fed back in the HARQ-ACK window are bundled into one HARQ-ACK, for example, 1 bit. Still referring to the example shown in FIG. 9, if downlink (DL) data on the subframes 1-4 are correctly received by the UE, the UE will transmit a positive HARQ-ACK, for example, "1" or "ACK", to the gNB. If any of the DL data on the subframes 1-4 is not correctly received by the UE, the UE will transmit a negative HARQ-ACK, for example, "0" or "NACK", to the gNB.

In embodiments using the scheme of partial bundling, resource n is used by current timing HARQ-ACK, all previous HARQ-ACKs in the window are bundled into one HARQ-ACK, for example, 1 bit, using another predefined resource e.g. n+1. Still referring to the example shown in FIG. 9, if the partial bundling is employed, the HARQ-ACK of DL data transmitted on subframe 4 is transmitted on resource n, while the HARQ-ACKs of DL data transmitted on subframes 1-3 are bundled into 1 bit which is transmitted on resource n+1.

Figure 10:
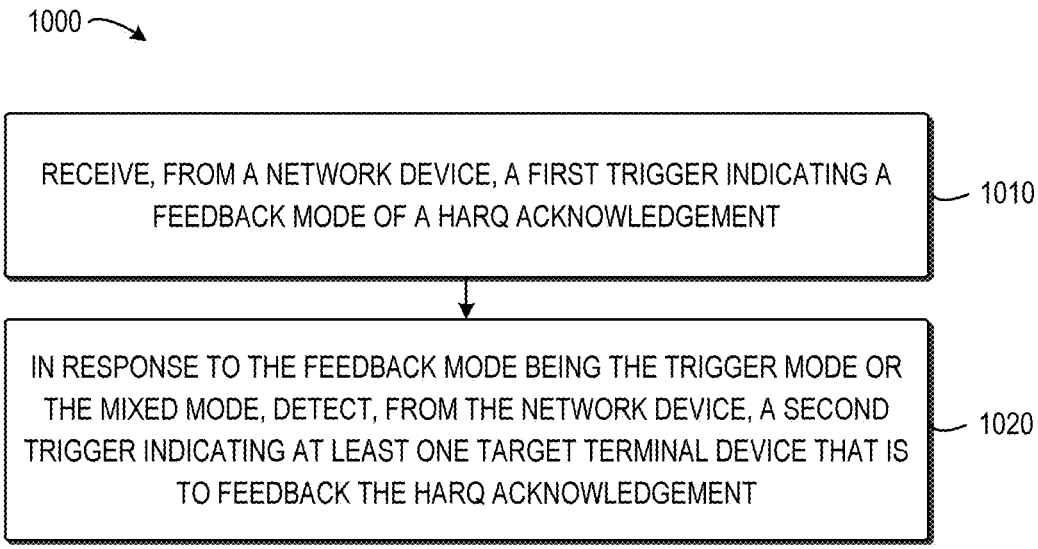
FIG. 10 shows a flowchart of a method 1000 of feedback of a HARQ acknowledgement in accordance with embodiments of the present disclosure.

FIG. 10 shows a flowchart of a method 1000 of feedback of a HARQ acknowledgement in accordance with embodiments of the present disclosure. The method 1000 may be implemented by a terminal device, for example, a UE.

The method 1000 is entered at 1010, where the terminal device receives, from a network device, a first trigger indicating a feedback mode of a HARQ acknowledgement. The feedback mode is selected from at least one of: a trigger mode, a timing mode, and a mixed mode.

According to embodiments of the present disclosure, the trigger mode represents a mode in which the HARQ-ACK is fed back according to triggers, namely, the first and second triggers as discussed. The timing mode represents a mode in which the HARQ-ACK is fed back based on timing. The mixed mode is a mode in which the timing mode is tried first, and if failed, the terminal device waits for the triggers.

In some embodiments, the first trigger may further indicate a HARQ acknowledgement group including slots and/or subframes to be fed back by the HARQ acknowledgement, a resource allocated for transmission of the HARQ acknowledgement, feedback timing, and/or the like.

In some embodiments, the HARQ acknowledgement group may comprise all schedulable subframes after the first trigger is transmitted. In other words, the HARQ acknowledgement of all schedulable subframes may be fed back in scheduled order since last trigger.

At 1020, in response to the feedback mode being the trigger mode or the mixed mode, the terminal device detects a second trigger from the network device. The second trigger indicates one or more terminal devices (also referred to as "target terminal device" hereafter) that are to feedback the HARQ acknowledgement based on the feedback mode indicated by the first trigger. For example, the second trigger may include identifier(s) of the target terminal device(s).

In some embodiments, the second trigger is a common trigger indicating that all terminal devices are to feedback the HARQ acknowledgement. In other words, all the terminal devices are target terminal devices in this case.

Alternatively, the second trigger may be a dedicated trigger indicating that one or more dedicated terminal devices are to feedback the HARQ acknowledgement. In such a case, the target terminal devices merely include the dedicated terminal device(s).

In addition or alternatively, the second trigger may further indicate that the feedback is to be performed on the allocated resource.

According to embodiments of the present disclosure, the terminal device may further determine whether the terminal device is to feedback the HARQ acknowledgement based on the second trigger. For example, the terminal device may determine whether it per se is a target terminal device based on identification(s) of the target terminal device(s) indicated in the second trigger. If the terminal device determines that it per se is to feedback the HARQ acknowledgement, it transmits the HARQ acknowledgement to the network device after a time interval from the reception associated with the second trigger.

Figure 11:
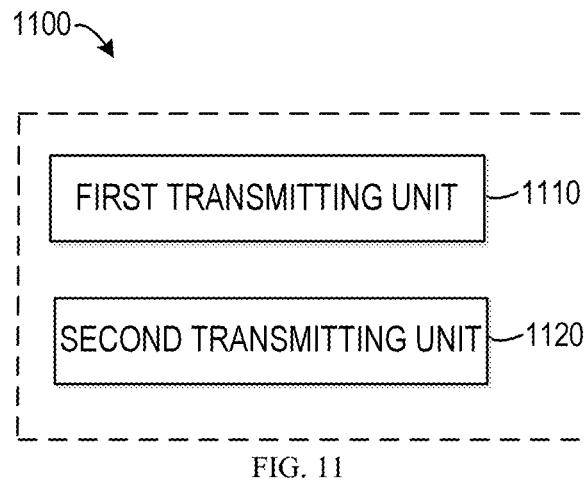
FIG. 11 shows a block diagram of an apparatus 1100 implemented at a network device in accordance with embodiments of the present disclosure.

Now reference is made to FIG. 11, which shows a block diagram of an apparatus 1100 implemented at a network device in accordance with embodiments of the present disclosure. It would be appreciated that the apparatus 1100 may be implemented at a network device, for example, a gNB.

As shown, the apparatus 1100 includes a first transmitting unit 1110 and a second transmitting unit 1120. The first transmitting unit 1110 is configured to transmit, to a terminal device, a first trigger indicating a feedback mode of a HARQ acknowledgement, the feedback mode being selected from at least one of: a trigger mode, a timing mode, and a mixed mode. The second transmitting unit 1120 is configured to, in response to successful access to an unsilenced band allocated to the HARQ acknowledgement, transmit, to the terminal device, a second trigger indicating at least one target terminal device that is to feedback the HARQ acknowledgement based on the feedback mode indicated by the first trigger.

In some embodiments, the first trigger further indicates at least one of: a HARQ acknowledgement group including slots and/or subframes to be fed back by the HARQ acknowledgement; a resource allocated for transmission of the HARQ acknowledgement; and feedback timing.

In some embodiments, the HARQ acknowledgement group comprises all or a portion of schedulable subframes after the first trigger is transmitted.

In some embodiments, the second trigger is a common trigger indicating that all terminal devices are to feedback the HARQ acknowledgement, or wherein the second trigger is a dedicated trigger indicating that a dedicated terminal device is to feedback the HARQ acknowledgement.

In some embodiments, the apparatus 1100 may further include a receiving unit configured to receive the HARQ acknowledgement from a target terminal device after a time interval from the transmission associated with the second trigger.

Figure 12:
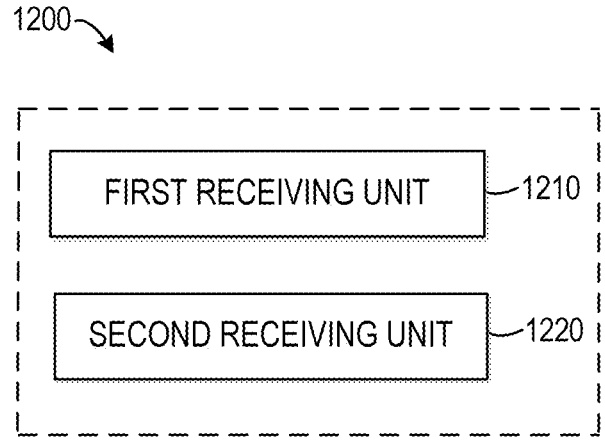
FIG. 12 shows a block diagram of an apparatus 1200 implemented at a terminal device in accordance with embodiments of the present disclosure.

FIG. 12 shows a block diagram of an apparatus 1200 implemented at a terminal device in accordance with embodiments of the present disclosure. It would be appreciated that the apparatus 1200 may be implemented at a terminal device, for example, a UE.

As shown, the apparatus 1200 includes a first receiving unit 1210 and a second receiving unit 1220. The first receiving unit 1210 is configured to receive, from a network device, a first trigger indicating a feedback mode of a HARQ acknowledgement, the feedback mode being selected from at least one of: a trigger mode, a timing mode, and a mixed mode. The second receiving unit 1220 is configured to, in response to the feedback mode being the trigger mode or the mixed mode, detect, from the network device, a second trigger indicating at least one target terminal device that is to feedback the HARQ acknowledgement.

In some embodiments, the first trigger further indicates at least one of: a HARQ acknowledgement group including slots and/or subframes to be fed back by the HARQ acknowledgement; a resource allocated for transmission of the HARQ acknowledgement; and feedback timing.

In some embodiments, the HARQ acknowledgement group comprises all or a portion of schedulable subframes after the first trigger is transmitted.

In some embodiments, the second trigger is a common trigger indicating that all terminal devices are to feedback the HARQ acknowledgement, or wherein the second trigger is a dedicated trigger indicating that a dedicated terminal device is to feedback the HARQ acknowledgement.

In some embodiments, the apparatus 1100 may further include a determining unit configured to determine whether the terminal device is to feedback the HARQ acknowledgement based on the second trigger; and a transmitting unit configured to, in response to determining that the terminal device is to feedback the HARQ acknowledgement, transmit the HARQ acknowledgement to the network device after a time interval from the reception associated with the second trigger.

It is also to be noted that the apparatus 1100 or 1200 may be respectively implemented by any suitable technique either known at present or developed in the future. Further, a single device shown in FIG. 2 or 10 may be alternatively implemented in multiple devices separately, and multiple separated devices may be implemented in a single device. The scope of the present disclosure is not limited in these regards.

It is noted that the apparatus 1100 or 1200 may be configured to implement functionalities as described with reference to FIG. 2 or 10. Therefore, the features discussed with respect to the method 200 may apply to the corresponding components of the apparatus 1100, and the features discussed with respect to the method 1000 may apply to the corresponding components of the apparatus 1200. It is further noted that the components of the apparatus 1100 or 1200 may be embodied in hardware, software, firmware, and/or any combination thereof. For example, the components of the apparatus 1100 or 1200 may be respectively implemented by a circuit, a processor or any other appropriate device. Those skilled in the art will appreciate that the aforesaid examples are only for illustration not limitation.

In some embodiment of the present disclosure, the apparatus 1100 or 1200 may comprise at least one processor. The at least one processor suitable for use with embodiments of the present disclosure may include, by way of example, both general and special purpose processors already known or developed in the future. The apparatus 1100 or 1200 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 1100 to at least perform according to the method 200 as discussed above and to cause the apparatus 1200 to at least perform according to the method 1000 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 11 or 12 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 13:
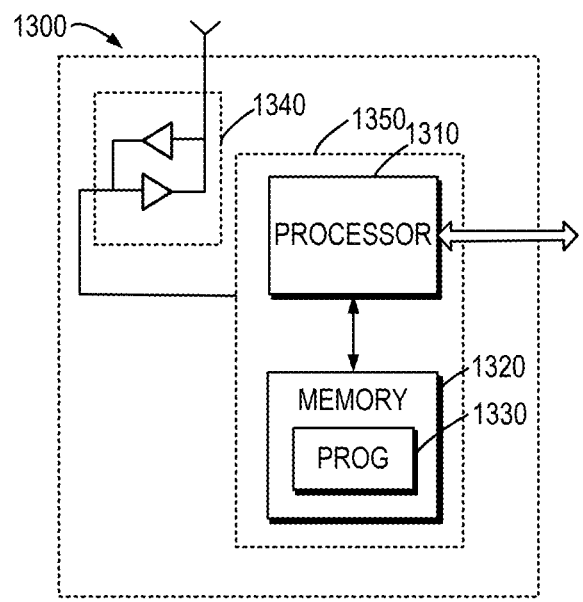
FIG. 13 shows a simplified block diagram of a device 1300 that is suitable for implementing embodiments of the present disclosure.

FIG. 13 is a simplified block diagram of a device 1300 that is suitable for implementing embodiments of the present disclosure. As shown, the device 1300 includes one or more processors 1310, one or more memories 1320 coupled to the processor(s) 1310, one or more transmitters and/or receivers (TX/RX) 1340 coupled to the processor 1310.

The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 1320 stores at least a part of a program 1330. The TX/RX 1340 is for bidirectional communications. The TX/RX 1340 has at least one antenna to facilitate communication, though in practice a terminal device or a network device mentioned in this disclosure may have several ones. The communication interface may represent any interface that is necessary for communication with other network elements.

The program 1330 is assumed to include program instructions that, when executed by the associated processor 1310, enable the device 1300 to operate in accordance with the embodiments of the present disclosure, as discussed herein with reference to FIGS. 2 and 10. That is, embodiments of the present disclosure can be implemented by computer software executable by the processor 1310 of the device 1300, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a user equipment (UE), the method comprising:
   receiving, from a base station, a first information in a first Downlink Control Information (DCI) corresponding to a Physical Downlink Shared Channel (PDSCH), the first information relating to a Hybrid Automatic Repeat Request acknowledgement (HARQ-ACK) information of the PDSCH;
   multiplexing, if the first information does not indicate a timing for transmitting the HARQ-ACK information and the UE receives a second information in a second DCI from the base station, the second information indicating a timing for transmitting the HARQ-ACK information, the HARQ-ACK information of the PDSCH in a Physical Uplink Control Channel (PUCCH) transmission at the timing indicated by the second information; and
   transmitting, to the base station, the HARQ-ACK information multiplexed in the PUCCH transmission based on the second information.

2. The method according to claim 1, wherein the second information is scrambled by a dedicated Radio Network Temporary Identifier (RNTI).

3. The method according to claim 1, wherein the HARQ-ACK information is associated with one or more HARQ process.

4. A user equipment (UE), comprising:
   a processor; and
   a memory, the memory containing program including instructions executable by the processor, the processor being configured to cause the UE to:
   receive, from a base station, a first information in a first Downlink Control Information (DCI) corresponding to a Physical Downlink Shared Channel (PDSCH), the first information relating to a Hybrid Automatic Repeat Request acknowledgement (HARQ-ACK) information of the PDSCH;
   multiplex, if the first information does not indicate a timing for transmitting the HARQ-ACK information and the UE receives a second information in a second DCI from the base station, the second information indicating a timing for transmitting the HARQ-ACK information, the HARQ-ACK information of the PDSCH in a Physical Uplink Control Channel (PUCCH) transmission at the timing indicated by the second information; and
   transmit, to the base station, the HARQ-ACK information multiplexed in the PUCCH transmission based on the second information.

* * * * *